(12) United States Patent
Torre-Bueno

(10) Patent No.: US 7,713,127 B1
(45) Date of Patent: May 11, 2010

(54) SIMULATING DIALOG IN ELECTRONIC GAMES

(76) Inventor: Ted De La Torre-Bueno, 2927 Broadway, Apt. 103, San Diego, CA (US) 92102

( * ) Notice: Subject to any disclaimer, the term of this patent is extended or adjusted under 35 U.S.C. 154(b) by 995 days.

(21) Appl. No.: 11/152,585

(22) Filed: Jun. 13, 2005

Related U.S. Application Data

(60) Provisional application No. 60/579,706, filed on Jun. 14, 2004.

(51) Int. Cl.
*A63F 9/24* (2006.01)
(52) U.S. Cl. .......................................... 463/35; 715/706
(58) Field of Classification Search ............. 463/28–31; 715/706, 716
See application file for complete search history.

(56) References Cited

U.S. PATENT DOCUMENTS

| | | | |
|---|---|---|---|
| 4,305,131 A * | 12/1981 | Best ........................... 715/716 |
| 5,358,259 A * | 10/1994 | Best ........................... 463/31 |
| 5,393,073 A * | 2/1995 | Best ........................... 463/35 |
| 6,418,440 B1 * | 7/2002 | Kuo et al. ..................... 707/10 |
| 6,798,426 B1 * | 9/2004 | Tateishi ..................... 715/706 |
| 2003/0137537 A1 * | 7/2003 | Guo et al. .................. 345/751 |
| 2004/0075677 A1 * | 4/2004 | Loyall et al. ................ 345/706 |

* cited by examiner

*Primary Examiner*—Peter DungBa Vo
*Assistant Examiner*—Alex F. R. P. Rada, II
(74) *Attorney, Agent, or Firm*—Fish & Richardson P.C.

(57) ABSTRACT

The present disclosure includes systems and techniques relating to simulating dialog in electronic games. In general, in one implementation, the technique includes: receiving a player interruption signal during presentation of a speech by a machine-controlled character in an electronic game, modifying a state of the machine-controlled character based on a time of the received player interruption relative to a length of the speech, and generating an action of the machine-controlled character based on the modified state. Modifying the state of the machine-controlled character can include adjusting an attitude variable of the machine-controlled character based on the time of the received player interruption, selecting a location in a dialog tree for the machine-controlled character based on the time of the received player interruption, or both.

20 Claims, 4 Drawing Sheets

SIMULATING DIALOG IN ELECTRONIC GAMES

CROSS REFERENCE TO RELATED APPLICATIONS

This application claims the benefit of the priority of U.S. Provisional Application Ser. No. 60/579,706, filed Jun. 14, 2004 and entitled "Simulating Dialog in electronic Games".

BACKGROUND

The present application describes systems and techniques relating to directing a machine-controlled character in an electronic game, for example, simulating dialog in a video role-playing game.

Existing games often conduct simulated conversations between the character controlled by the player (PC) and the characters controlled by the computer (NPCs) using dialog trees.

SUMMARY

The present disclosure includes systems and techniques relating to simulating dialog in electronic games. According to an aspect, a player interruption signal is received during presentation of a speech by a machine-controlled character in an electronic game, a state of the machine-controlled character is modified based on a time of the received player interruption relative to a length of the speech, and an action of the machine-controlled character is generated based on the modified state. Receiving the player interruption signal can include receiving a player selection of an interruption option displayed during the presentation of the speech by the machine-controlled character. Modifying the state of the machine-controlled character can include adjusting an attitude variable of the machine-controlled character based on the time of the received player interruption.

Modifying the state of the machine-controlled character can include selecting a location in a dialog tree for the machine-controlled character based on the time of the received player interruption. Generating the action can include outputting a new speech based on the location. Generating the action can include outputting the new speech based on the location and a player input. Generating the action can include outputting the new speech based on the location and the time. Moreover, generating the action can include returning to presenting the speech when the player interruption is cancelled.

DRAWING DESCRIPTIONS

Details of one or more embodiments are set forth in the accompanying drawings and the description below. Other features and advantages may be apparent from the description and drawings, and from the claims.

DETAILED DESCRIPTION

Figure 1:
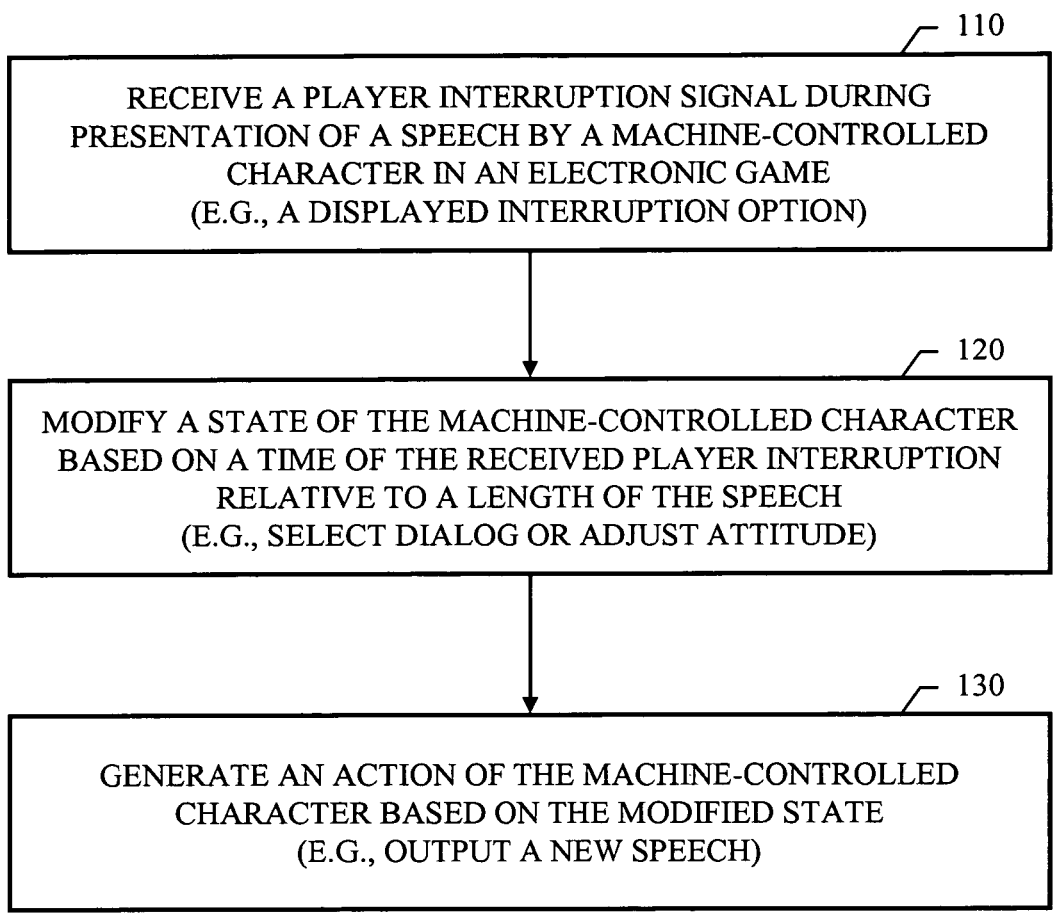
FIG. 1 shows a process of simulating dialog in electronic games.

FIG. 1 shows a process of simulating dialog in electronic games. During presentation of a speech by a machine-controlled character in an electronic game, a player interruption signal is received at 110. Receiving the player interruption signal can include receiving a player selection of an interruption option displayed during the presentation of the speech by the machine-controlled character. Other types of interruption options and methods of acquiring such are also possible.

A state of the machine-controlled character is modified based on a time of the received player interruption relative to a length of the speech at 120. For example, modifying the state of the machine-controlled character can include adjusting an attitude variable of the machine-controlled character based on the time of the received player interruption. Alternatively or additionally, modifying the state of the machine-controlled character can include selecting a location in a dialog tree for the machine-controlled character based on the time of the received player interruption.

An action of the machine-controlled character is generated based on the modified state at 130. This can include outputting a new speech based on the location, a player input, the time of the received player interruption, or some combination of these. Moreover, generating the action can include returning to presenting the speech when the player interruption is cancelled.

Figure 2:
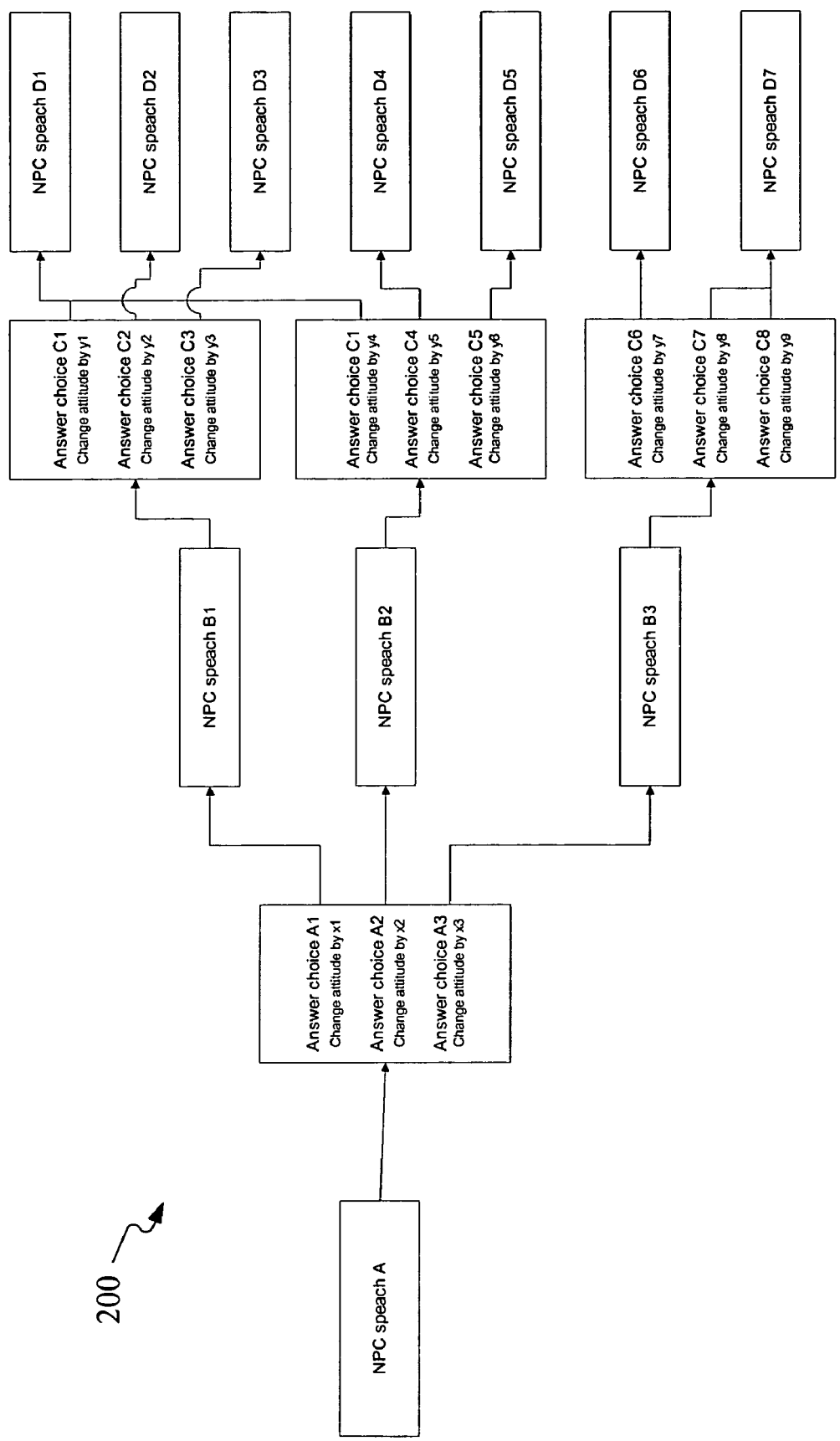
FIG. 2 shows an example dialog tree.

Dialogue interaction is frequently implemented using a dialog tree. FIG. 2 shows an example dialog tree 200. In a dialog tree the computer has a stored speech the NPC (non-player character) is going to give in a certain encounter (NPC Speech A in the figure). This may be recorded speech by a voice actor or generated by a speech synthesizer and typically also appears as text. Once the computer has spoken, the player is presented with a list of possible responses and chooses one (Answer choices A1 through A3 in FIG. 2). Conceptually the PC (player character) is saying one of these statements in response to the NPC's statement.

Often the computer model of the game maintains a variable which represents the NPC's attitude toward the PC. Different selections of response may alter this variable by some degree either positively or negatively. The game program may have further stored statements to use depending on the players choices of response, so the number of paths the conversation can take will grow as the number of exchanges increases, hence the term dialog tree. Based on the answers the player selects various consequences will occur in the game.

Although dialog trees are an attempt to give the player the experience of conducting a conversation, they are only a limited and partial simulation of real human interaction. Part of this is due to the requirement that the player select from a prepared list of responses since a program which could parse human speech and decide the next NPC response is well beyond the state of the art. There is however another way in which this model does not simulate real conversation and this is the element of time and interruptions.

In a standard dialogue tree the computer puts forwards the statement of the NPC with whom the player's PC is interacting. Effectively this statement takes place in zero time since the player usually has the option to skip listening to the statement altogether and can respond to the text before the computer character is finished speaking. This preemptive response conceptually takes place after the computer finished its statement. This model of interaction allows for only limited interactivity between the player and the computer. The player is essentially a passive participant in the conversation—how they respond is only partially under their control and when is entirely at the mercy of the computer. Most importantly the player can never interrupt the NPC although interruptions are characteristic of real conversations.

By introducing an element of time and player participation into a game (e.g., time dependent dialog trees), a video game can significantly increase the realism and immersion of conversation trees. By introducing the concept of time into dialogue interaction the player is forced to become a participant in the conversation. If the player has the ability to interrupt the computer, or to interject their own input between the computer character's speech the possibilities that are created are practically endless.

A conversation tree could be created that would make it possible for the player to alter the outcome of the interaction based on when they chose to respond or what they chose to respond to. The player has more leeway in how to play their character: Characters can be active or passive—players could even play characters that are almost entirely non-participatory.

What follows is an example of real time dialogue in a game: A player character, Leitus, is confronted by a NPC, Diagastores, the patron of a merchant that Leitus is suspected of having murdered. Diagastores accuses Leitus of murdering the merchant. After a pause Diagastores goes on to present his evidence. If the player chooses not to challenge the evidence while Diagastores is speaking Diagastores draws his weapon and attacks Leitus at the end of his speech. If, on the other hand, Leitus had interjected his own story during or before the period in which Diagastores was presenting his evidence, he might have been able to steer the conversation down a different path, possibly even avoiding the ensuing combat.

Another instance where this conversational effect can come into play is in the realm of behavior. A PC is often a person in a position of authority in the game world. NPCs will be supplicating to them all the time. Preventing them from doing this while in a position of strength may be appropriate and may well increase NPC's opinion of the player.

It also fundamentally changes the nature of diplomatic interaction with characters whose station is similar to the players. It gives the player the choice of playing a dominant or supporting role, of playing the senior or junior player in a conversation. By allowing the player to have the choice of when to speak in addition to what to say, the player is given enormously greater input into his character and the world. Not knowing if the other character has anything to say and having to choose when to respond makes the player a real participant in the conversation as opposed to just an observer of it.

This method also greatly enhances the desirability of the game for repeated play. In existing methods, once the player has played the game once they have a good idea of all available conversational paths since at every choice point they must see all possible responses. In this new method, the player will never know without trying if other conversational paths might have been available if they had interrupted at some critical moment.

Finally, there need not be any drawbacks to this approach. If the player chooses to interrupt someone else but decides they don't like any of the options they are presented with they can simply choose not to interrupt at all in which case the game resumes as if the player had never spoken up at all.

Figure 3:
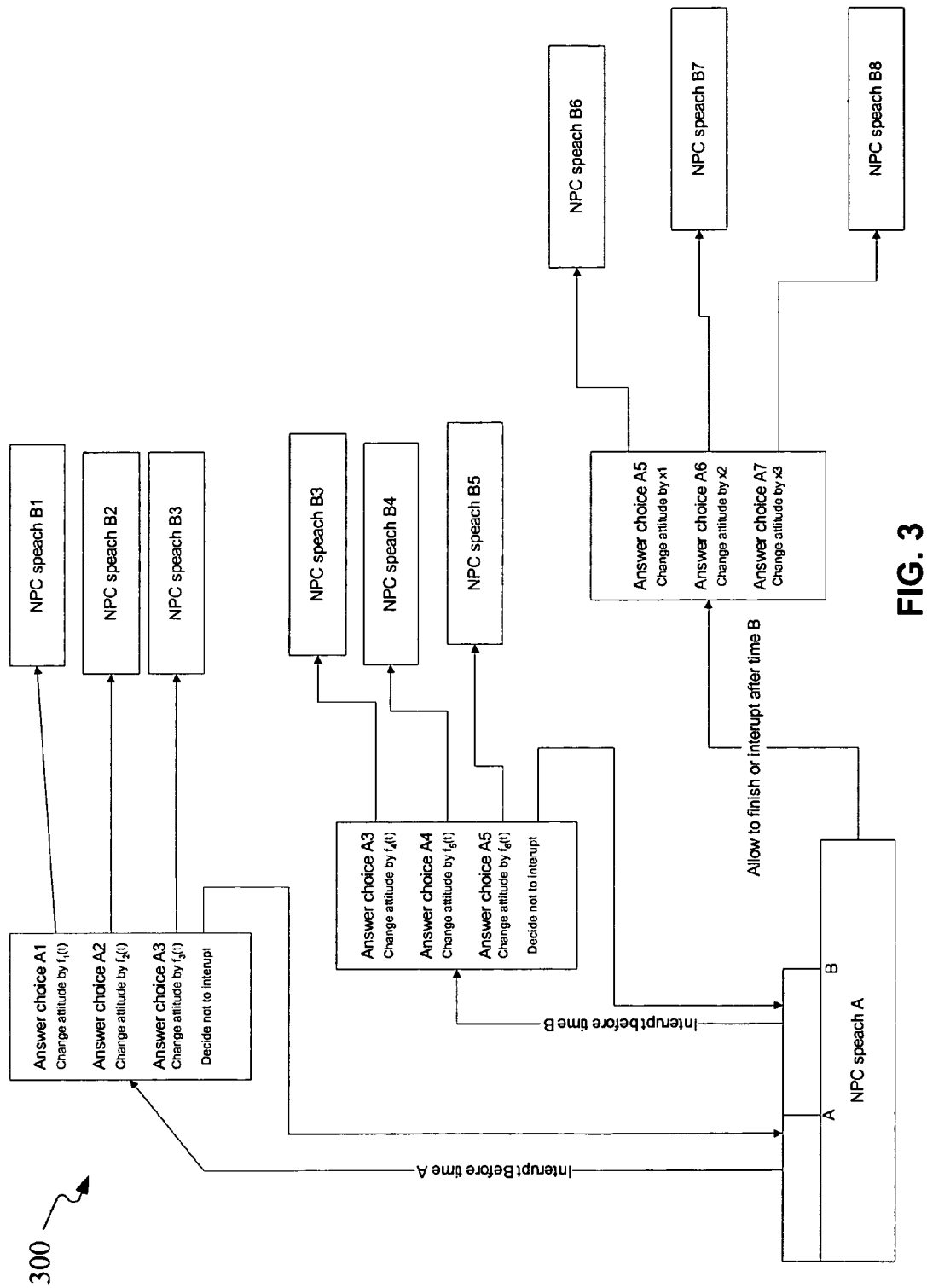
FIG. 3 shows an example real time dialog tree.

FIG. 3 shows an example real time dialog tree 300 incorporating the option of player interruption. As in the more basic dialog tree the computer generates the NPC's speech except this time there is no text or the text scrolls at the same rate as the speech. There is a button or key the player can press to interrupt the NPC. Preprogrammed into the computer are time breakpoints that determine what answer choices are available based on when the interruption occurs. In FIG. 3, if the player interrupts before time A they are presented with answer choices A1 through A3. If they don't like any of the choices they select a fourth "never mind" choice (decide not to interrupt), and the game can continue as though the player lets the NPC continue speaking (or never contemplated interrupting at all). If the player interrupts between time A and B, they get a different set of choices. Finally, if they let the NPC finish speaking, they get yet another set of choices. After each choice the NPC can speak again, and the tree can continue as deep as the game designer wants. Note that sometimes the choices or responses can be the same on different paths. Game designers often do this to prevent to dialog tree from growing too large.

Another subtlety this method permits is that the change in NPC attitude the game attaches to each choice can be a function of how long the player waits to interrupt. In the existing method each choice is at most associated with a fixed change in attitude but in this improvement the change in attitude might depend on how long the player allowed the NPC to speak. For instance, interrupting to agree might improve the NPC's attitude if enough time had elapsed for the NPC to get out their point but might actually cause a decrease in attitude if done too soon.

Another feature of conversation this method can simulate is the requirement that a participant in a conversation sense when the other party is done with their statement. In traditional video games, the computer speaks and then presents the possible answers so the player knows when the NPC is done. In contrast, the present time dependent interaction allows the NPC to pause, and if the player does not hit the interrupt button and select their answer, the NPC can then do what a human would normally do in that situation, which may be to resume speaking or take some other action. In fact, humans are often made uncomfortable by silence, so if the player did not listen and respond at the appropriate time, they might suffer reaction modifiers in the game, and favorable conversation paths might be passed up.

Figure 4:
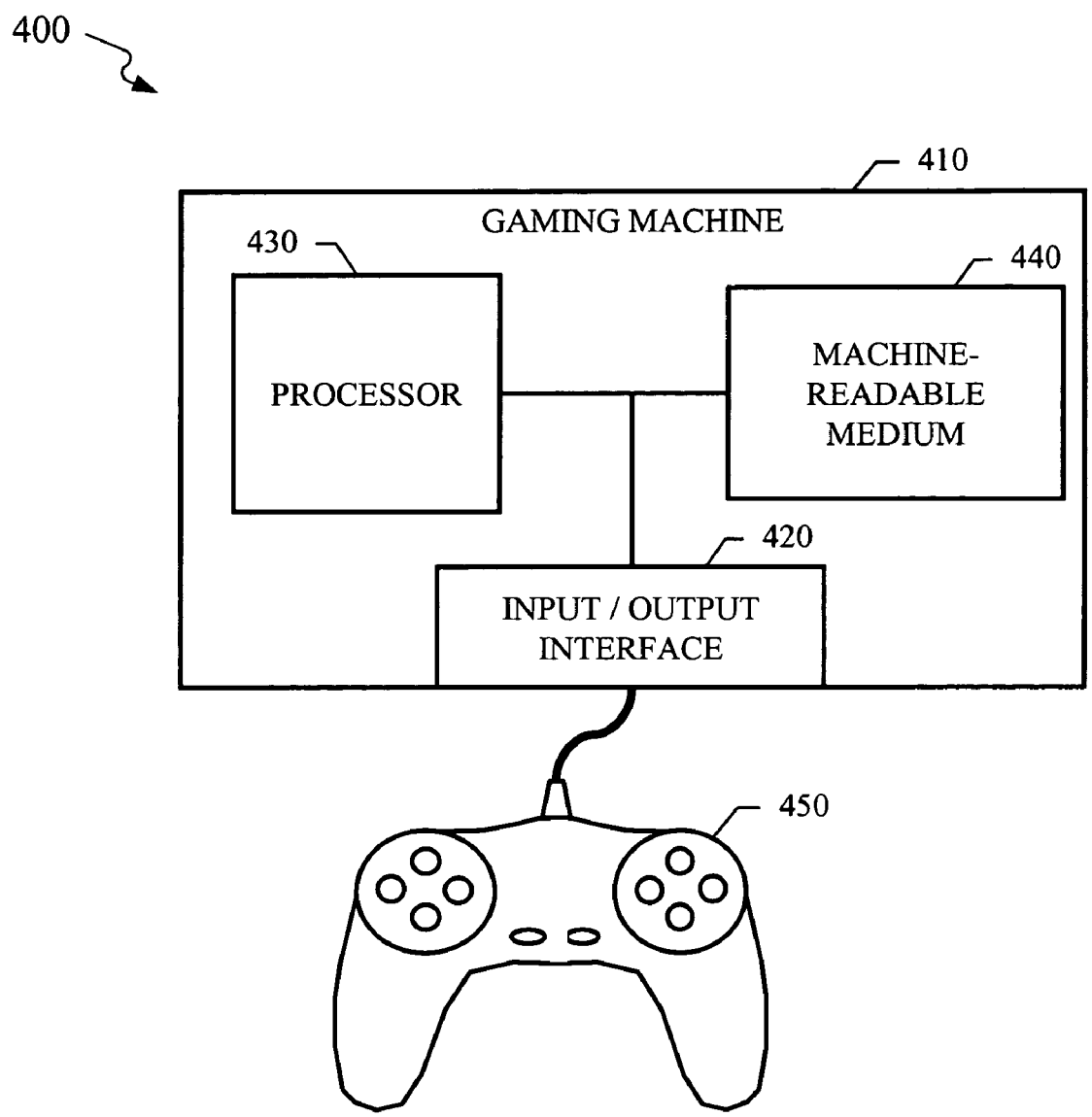
FIG. 4 shows an example gaming system.

FIG. 4 shows an example gaming system 400. The gaming system 400 includes a gaming machine 410 and an input device 450. The gaming machine 410 includes an input/output (I/O) interface, which can be used to couple the gaming machine 410 with the input device 450 and also with an output device (e.g., a monitor, television, display). The gaming machine 410 also includes a processor 430 and a computer-readable medium 440. The computer-readable medium can be built-in memory, a removable storage device (e.g., an optical disk, magnetic disk, game cartridge), or a combination of such.

The computer-readable medium 440 tangibly embodies (encodes) a program including instructions operable to cause one or more data processing apparatus (e.g., the processor 430) to perform operations, as described above. Thus, the computer-readable medium 440 represents a game controller in that it provides information that affects operation of an electronic game. Other types of game controllers are also possible, and the game system 400 is just an example of one type of implementation of the invention.

Embodiments of the invention and all of the functional operations described in this specification can be implemented in digital electronic circuitry, or in computer software, firmware, or hardware, including the structural means disclosed in this specification and their structural equivalents, or in combinations of them. Embodiments of the invention can be implemented as one or more computer program products, i.e., one or more modules of computer program instructions encoded in a computer-readable medium, e.g., a machine readable storage device, a machine readable storage medium, a memory device, or a machine-readable propagated signal, for execution by, or to control the operation of, data processing apparatus. The term "data processing apparatus" encompasses all apparatus. devices and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is made to encode information for transmission to suitable receiver apparatus. A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data (e.g., one or more scripts in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The various implementations described above have been presented by way of example only, and not limitation. For example, the logic flows depicted do not require the particular order shown, sequential order, or that all operations illustrated be performed, to achieve desirable results. In certain implementations, multitasking and parallel processing may be preferable. Other embodiments may be within the scope of the following claims.

What is claimed is:

1. A machine-implemented method comprising:
   receiving a player interruption signal during presentation of a speech by a machine-controlled character in an electronic game;
   modifying a state of the machine-controlled character based on a time of the received player interruption relative to a length of the speech; and
   generating an action of the machine-controlled character based on the modified state;
   wherein the length of the of speech has a time value X, the time of the received player interruption has a time value Y, which is different than the time value X, and the speech has at least one associated time point having a time value Z, which is also different than the time value X; and
   wherein the modifying comprises comparing the time value Y to the time value Z and selecting a character state from multiple available character states in accordance with a result of comparing the time value Y to the time value Z.

2. The method of claim 1, wherein modifying the state of the machine-controlled character comprises selecting a location in a dialog tree for the machine-controlled character based on the time of the received player interruption.

3. The method of claim 2, wherein generating the action comprises outputting a new speech based on the location.

4. The method of claim 3, wherein generating the action comprises outputting the new speech based on the location and a player input.

5. The method of claim 3, wherein generating the action comprises outputting the new speech based on the location and the time.

6. The method of claim 2, wherein generating the action comprises returning to presenting the speech when the player interruption is cancelled.

7. The method of claim 1, wherein modifying the state of the machine-controlled character comprises adjusting an attitude variable of the machine-controlled character based on the time of the received player interruption.

8. The method of claim 1, wherein receiving the player interruption signal comprises receiving a player selection of an interruption option displayed during the presentation of the speech by the machine-controlled character.

9. A program tangibly embodied in a computer-readable medium, the program comprising instructions operable to cause one or more data processing apparatus to perform operations comprising:

receiving a player interruption signal during presentation of a speech by a machine-controlled character in an electronic game;

modifying a state of the machine-controlled character based on a time of the received player interruption relative to a length of the speech; and generating an action of the machine-controlled character based on the modified state;

wherein the length of the of speech has a time value X, the time of the received player interruption has a time value Y, which is different than the time value X, and the speech has at least one associated time point having a time value Z, which is also different than the time value X; and wherein the modifying comprises comparing the time value Y to the time value Z and selecting a character state from multiple available character states in accordance with a result of comparing the time value Y to the time value Z.

10. The program of claim 9, wherein modifying the state of the machine-controlled character comprises selecting a location in a dialog tree for the machine-controlled character based on the time of the received player interruption.

11. The program of claim 10, wherein generating the action comprises outputting a new speech based on the location.

12. The program of claim 11, wherein generating the action comprises outputting the new speech based on the location and a player input.

13. The program of claim 11, wherein generating the action comprises outputting the new speech based on the location and the time.

14. The program of claim 10, wherein generating the action comprises returning to presenting the speech when the player interruption is cancelled.

15. The program of claim 9, wherein modifying the state of the machine-controlled character comprises adjusting an attitude variable of the machine-controlled character based on the time of the received player interruption.

16. The program of claim 9, wherein receiving the player interruption signal comprises receiving a player selection of an interruption option displayed during the presentation of the speech by the machine-controlled character.

17. A system comprising:

an input/output interface; and a game controller including information indicative of instructions operable to cause one or more data processing apparatus to perform operations comprising receiving a player interruption signal during presentation of a speech by a machine-controlled character in an electronic game, modifying a state of the machine-controlled character based on a time of the received player interruption relative to a length of the speech, and generating an action of the machine-controlled character based on the modified state;

wherein the length of the of speech has a time value X, the time of the received player interruption has a time value Y, which is different than the time value X, and the speech has at least one associated time point having a time value Z, which is also different than the time value X; and wherein the modifying comprises comparing the time value Y to the time value Z and selecting a character state from multiple available character states in accordance with a result of comparing the time value Y to the time value Z.

18. The system of claim 17, wherein modifying the state of the machine-controlled character comprises selecting a location in a dialog tree for the machine-controlled character based on the time of the received player interruption.

19. The system of claim 18, wherein generating the action comprises outputting a new speech based on the location.

20. The system of claim 17, wherein modifying the state of the machine-controlled character comprises adjusting an attitude variable of the machine-controlled character based on the time of the received player interruption.

* * * * *